United States Patent [19]
Brain

[11] 3,761,073
[45] Sept. 25, 1973

[54] DEVICE FOR AUTOMATICALLY GUIDING MATERIAL DURING SEAM FORMATION

[75] Inventor: Douglas Harold Brain, Giffnock, Scotland

[73] Assignee: J. & P. Coats Limited, Glasgow, Scotland

[22] Filed: Sept. 14, 1971

[21] Appl. No.: 180,287

[52] U.S. Cl............. 271/79, 112/203, 112/221.11, 112/221.15
[51] Int. Cl.. D05b 27/00, D05b 69/00, B65h 29/28
[58] Field of Search............................. 271/79, 45; 112/121.15, 121.11, 203

[56] References Cited
UNITED STATES PATENTS

| | | | |
|---|---|---|---|
| 3,322,081 | 5/1967 | Winberg | 112/121.15 |
| 1,540,687 | 6/1925 | Feistel | 271/79 |
| 3,087,446 | 4/1963 | Flach | 112/203 |
| 3,469,545 | 9/1969 | Hale | 271/45 |
| 3,151,583 | 10/1964 | Troll | 112/121.11 |
| 3,203,386 | 8/1965 | Briggs | 112/203 |
| 3,361,094 | 1/1968 | Bono | 112/121.11 |

Primary Examiner—Richard E. Aegerter
Attorney—Larson, Taylor and Hinds

[57] ABSTRACT

A device for automatically guiding work pieces of textile and other material includes a guide rail along which are slidable clamps arranged to hold the work pieces and guide them to a position where the desired operation is to be performed on them. A transfer belt is provided to receive each work piece from the clamps and feed it to the position where the operation is to be performed on it. Spacing apparatus is incorporated in the device for automatically spacing the clamps ready to receive a work piece at a loading position and means are provided for opening and closing the clamps at the necessary positions and for transferring clamps which have just guided a work piece back to the starting position.

20 Claims, 10 Drawing Figures

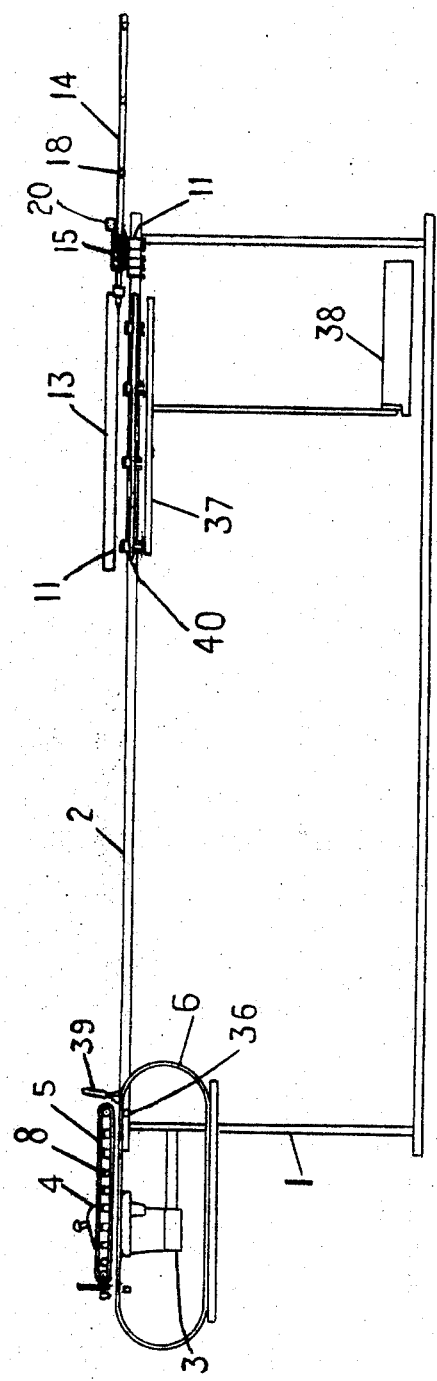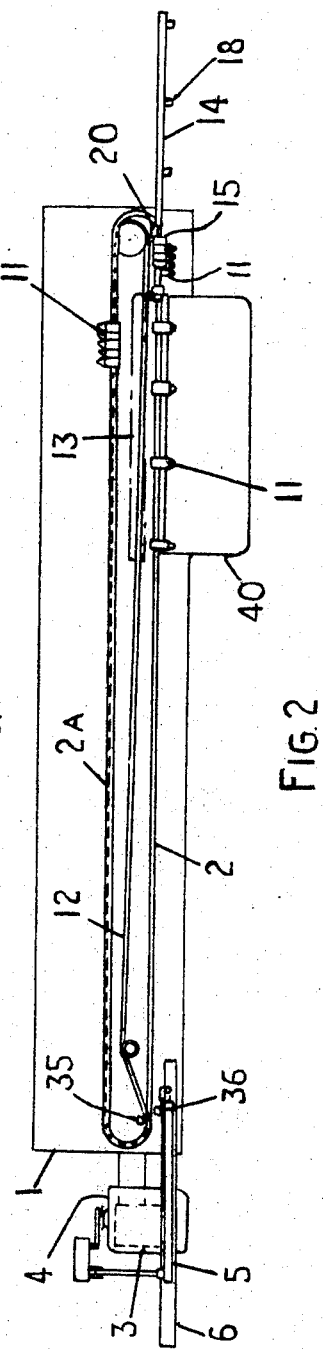

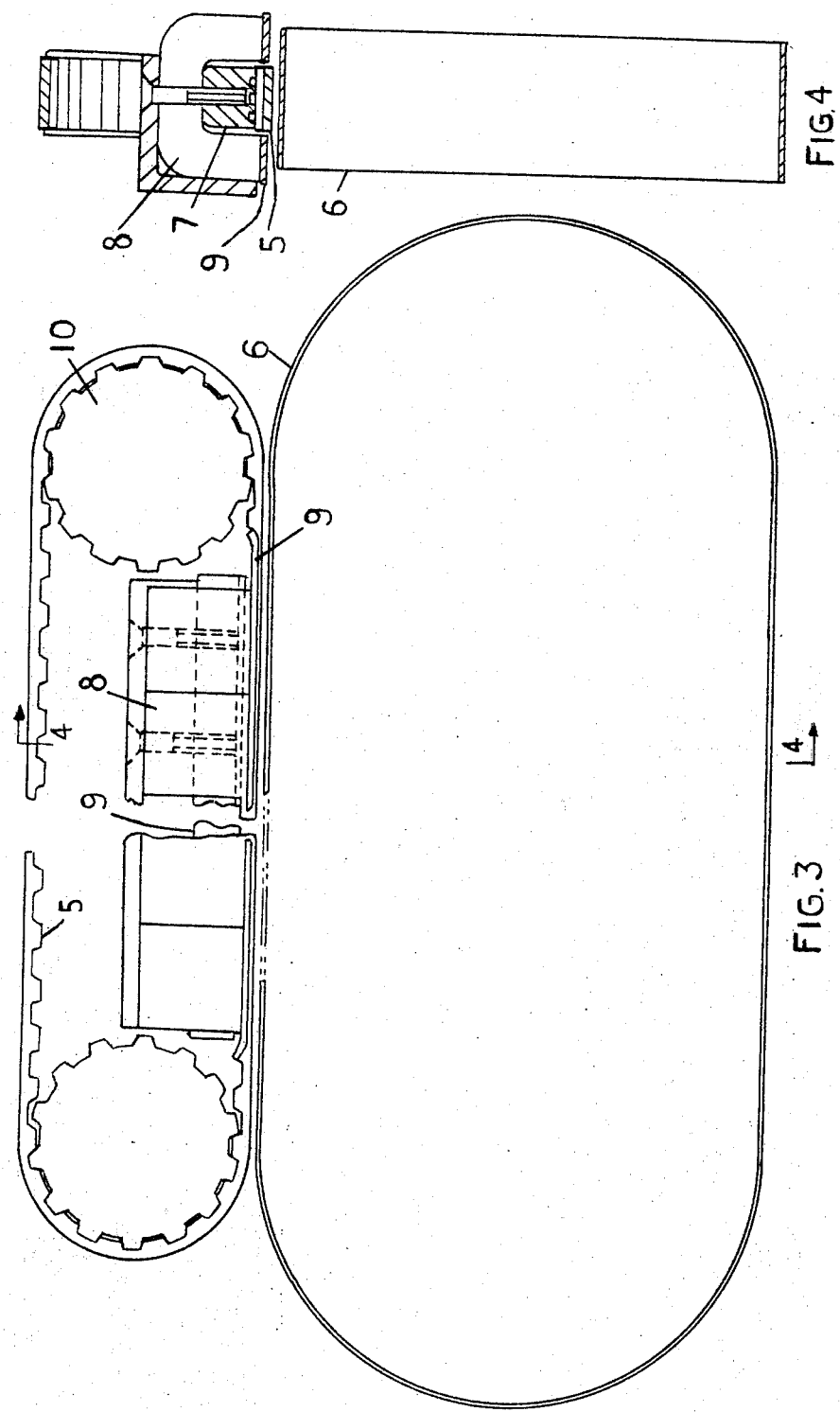

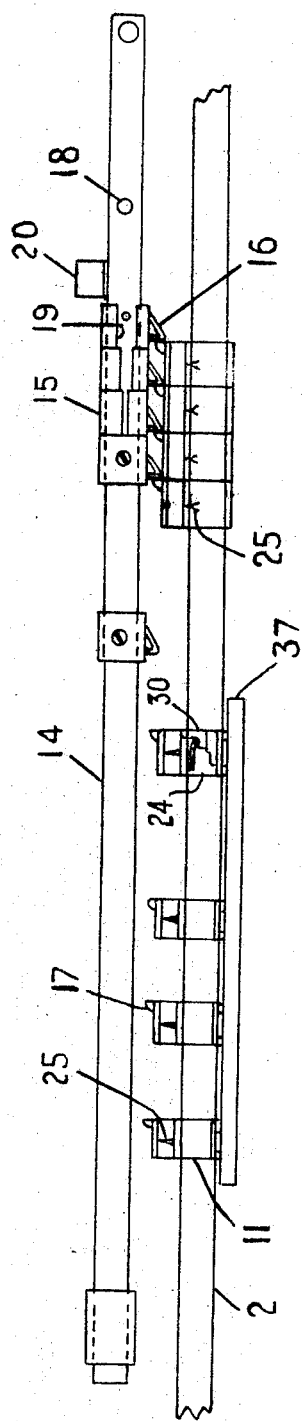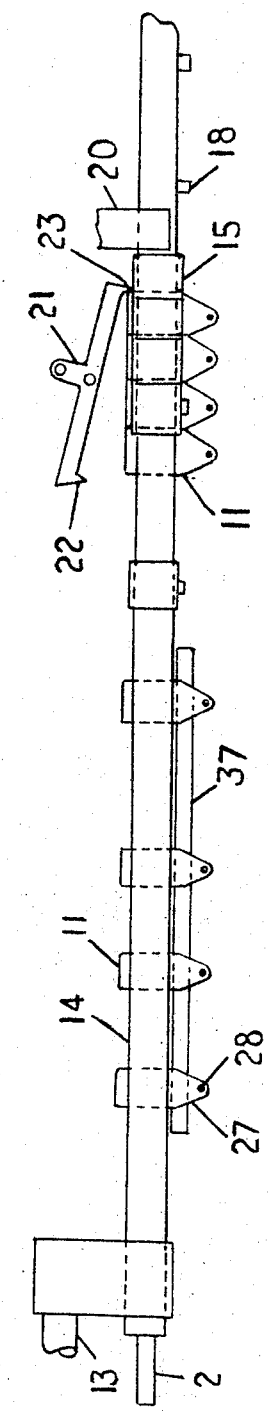

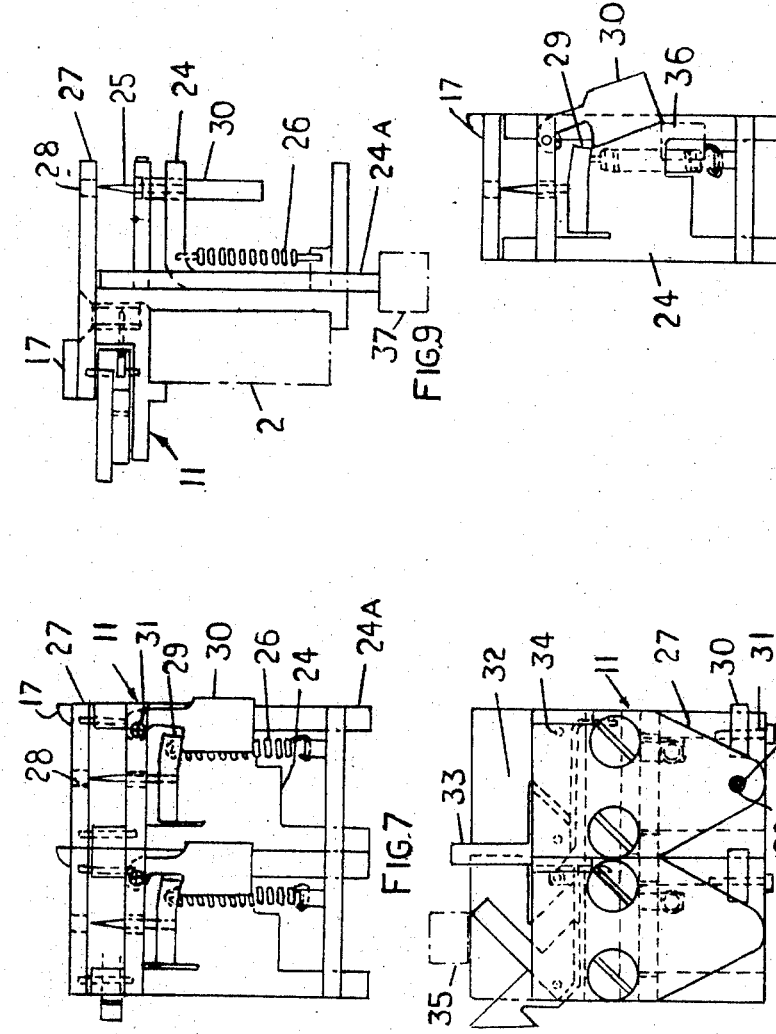

DEVICE FOR AUTOMATICALLY GUIDING MATERIAL DURING SEAM FORMATION

The subject of this invention is a device for automatically guiding work pieces of sheet material so as to make it possible to perform automatically seam formation and other operations such as hemming and rucking along the edges of the work pieces which may be of textile and other like materials, by guiding the work pieces in the necessary direction.

One type of work to which the device is particularly applicable is the formation of garments in which two pieces of garment-forming material are to be joined together along one edge which may be curved over at least a part of its length. It is an object of the present invention to make it possible to perform operations of such a nature automatically on one work piece after another without pause.

It has been previously proposed to provide an automatic guiding device which incorporates a guide rail pivoted at one end and swingable transversely of the direction of feed of a sewing machine, edge-sensing means, e.g., photo-electric cells being provided to cause swinging movement of the guide rail in accordance with the shape of the the edge to be stitched as detected by the edge-sensing means, a clamp movable along the guide rail being attachable to the trailing end of a work piece and a conveyor belt circulatory in the same direction as the direction of feed of the sewing machine being provided to lead the work towards the sewing machine. This device is effective in sewing automatically individual work pieces in individual sewing operations but it is unsuitable for sewing automatically individual work pieces in succession as a continuous operation because the guide rail in its swinging movement in conformity with the shape of the edge being sewn may at the time a fresh work piece requires to be introduced by occupying a transverse position unsuitable for the introduction of the fresh work piece behind the trailing edge of the work piece actually passing through the machine, also the swinging movement of the guide rail requires individual attention from an operator to fit a clamp thereto when each new work piece is being introduced to the device. There are also other disadvantages of the previously proposed device. It is an object of the present invention to provide a device which is capable of feeding and guiding automatically work pieces in a series through a machine for performing a chosen operation without stopping the machine.

A device according to the invention incorporates a machine support arranged to support a machine for performing a desired operation on work pieces, a guide rail fixed relative to the machine support in an orientation parallel to the direction of feed of a machine to be fitted to the support, several work piece-gripping clamps freely slidable along the rail, means for causing each clamp to grip a work piece at a chosen loading position remote from the machine support and to release its grip as it approaches the support while moving along the guide rail, a circulatory transfer belt one flight of which is disposed parallel to the said direction of feed and extends in advance of and also rearwardly of the position to be occupied by a machine on the machine support and means for returning clamps from the end of the guide rail adjacent to the machine support to the end of the guide rail remote from the machine support.

The device may incorporate a work-tensioning device operable to apply a retarding force to a work piece being fed.

The transfer belt may be arranged to be driven or undriven.

The clamps may be fitted with coupling means so that two adjacent clamps may be coupled to one another.

Means may be provided operable to connect the clamps to the belt as they reach the said chosen position. Means may be provided operable to disconnect the clamps from the belt as they leave the said chosen position and braking means may be provided operable to apply a retarding force to the belt.

The work-tensioning device may be a circulatory belt one flight of which is disposed parallel to the direction of feed of the machine.

Alternatively, the work-tensioning device may be at least one brake shoe engageable with the clamps at the said chosen position on the guide rail.

In further alternatives the work-tensioning device may be at least one braked undriven belt directly engageable with at least one work piece in the machine or at least one brake shoe directly engageable with at least one work piece in the machine. A simple form of work-tensioning device is constituted by a bunch of bristles arranged to press against a work piece being fed. This type of work-tensioning device has the advantage of operating to flatten the work piece.

The means for connecting selected clamps to the said flight of the work tensioning blet may be a mechanical connecting means or may be magnetic means, e.g., the belt may carry plates of magnetic material and the clamps may carry magnets. Alternatively the belt may carry magnets and the clamps may present faces of magnetic material to the belt at the appropriate position.

There may be provided a thrustor device operative to engage a selected number of clamps at the end of the guide rail remote from the machine support and push them to a loading position on the guide rail, and a manually operated control lever, arranged to control operation of the thrustor device and also to be operative to close the clamps at the loading position on to a work piece placed there.

The thrustor device may incorporate a pneumatically operated piston.

The manually operated control lever may be a pedal.

An undriven under belt may be located below the transfer belt which is arranged to be driven, said under belt being of a construction such that it is attracted to a magnetised object. Stationary magnetic pole pieces may be disposed adjacent opposite edges of the lower flight of the transfer belt facing the under belt.

The magnetic pole pieces may be constituted by two bars disposed one on each side of the lower flight of the transfer belt, several horseshoe magnets bridging the transfer belt transversely and having their pole faces connected one to each bar.

The horseshoe magnets may be suspended from a fixed carrier bar. Preferably the carrier bar is disposed between the upper and lower flights of the transfer belt and the horseshoe magnets straddle the carrier bar and rest on it, the undersurface of the carrier bar being arranged as a slipper surface along which the lower flight of the transfer belt is movable.

Preferably the undersurfaces of the pole pieces occupy a slightly retracted position with respect to the surface of the lower flight of the transfer belt presented to the under belt.

The transfer belt with the associated magnets and the under belt may be constructed as a unit which is movable vertically relative to the machine support.

The device of the invention may incorporate mechanism for spacing clamps making up a set at the loading position the desired distance apart ready for engaging a workpiece with the clamps. Such mechanism may consist of a detent support bar disposed parallel with and reciprocable in a direction parallel with the guide rail, i.e., in a feeding direction towards and a retracting direction from the machine support, detent devices slidably mounted on the detent support bar, each detent device being capable of entraining a clamp only when moved in the feeding direction, and stops adjustably mounted on the bar and so co-operating with the detent devices that all said detent devices can slide freely along the bar to the end of the bar adjacent the machine support, but each detent device can slide along the bar towards the end remote from the machine support only as far as a stop particular to that detent device.

There may be provided in association with the guide rail a withdrawable arrester detent timed to operate in relation to movement of the thruster device to engage the first clamp reaching a waiting position in advance of the loading position so that the following clamps form a close queue, and to be withdrawn when a set of clamps is to be moved to the loading position by movement of the detent support bar in the feeding direction towards the loading position and a detent abutment engageable by the detent device which leads when the detent support bar is moving in the retracting direction away from the loading position, the arrester detent and the detent abutment being so located relative to one another that when a queue of clamps is waiting at the waiting position and the detent support bar is fully retracted away from the loading position each detent device is at the appropriate place to engage a respective clamp.

The means for causing the clamps to grip a work piece applied to them may include a clamp-closing bar extending along the length of the loading position and movable towards all clamps located any where at the loading position to engage means provided on the clamps for closing the clamps.

The detent engageable with the leading clamp and the clamp-closing bar may be operatively coupled to the lever for operating the thruster.

To permit the detent devices to slide freely all the way to the end of the detent support bar adjacent the machine support but to cause each to be stopped by its appropriate stop when slid in the direction towards the end of the detent support bar remote from the machine support each stop may be formed to have a portion having a transverse dimension which in each succeeding stop nearer the end of the detent support bar remote from the machine support is progressively greater than that of the preceding stop and each detent device is formed with an open slot in line with the said portions of the stops, the width of the slot in each succeeding detent device nearer the end of the detent support bar remote from the machine support being greater than the width of the slot in the preceding detent device, while the width of the slot in each detent device is less than the transverse dimension of the said portion of its particular stop but greater than the transverse dimensions of the said portions of the preceding stops.

The machine for performing the desired operation may be for example a sewing machine or may be a plastics welding machine.

Where the machine is a sewing machine the device may incorporate cutting means for cutting the seaming thread between the work pieces, the cutting means being arranged at a point behind the needle and being arranged to be operable, e.g., by a photo-electric device or an air pressure or suction device when the trailing edge of each work piece has passed through the sewing machine and has come into the necessary relationship with the cutting device.

The guide rail may incorporate a return portion arranged to receive clamps after they have released their grip.

The guide rail may be formed as an endless loop having two substantially parallel portions one of which constitutes the portion of the guide rail leading to the machine support and the other of which constitutes the return portion.

The guide rail may incorporate a swinging portion located adjacent the transfer belt and swingable in a transverse direction. The swinging movement may be controlled by signals from a detecting device arranged to detect the contour of the edge of the work piece to be operated on by the machine. Such device may be a photo-electric device or a device operating by air under pressure or by suction. In this construction the transfer belt may be so mounted as to be bodily swingable transversely also.

The means for causing each clamp to release its grip may incorporate a spring-loaded or a gravity-biased catch arranged to be tripped when the clamp reaches the release position.

The clamps may be returned to the said other end of the guide rail either by gravity feed down a separate inclined rail or by a separate endless clamp-return belt. In the latter construction the guide rail is in the form of a continuous loop as already described and the endless belt is disposed to engage clamps on the return portion of this loop. The clamp-return belt may be power driven or may be activated by a foot-operated treadle which may also serve to close the clamps as each work piece is in clamping position.

Means may be incorporated for automatically attaching one or more clamps to the guide rail at appropriate positions on the guide rail, ready for attaching to the next work piece. Said clamp-attachment means may be mechanical, electrical or pneumatic means and may be triggered by removal of the last clamp from the loading area or from the clamp closing mechanism.

Similar means may be incorporated to remove the loaded clamps from the loading area.

A practical embodiment of the invention is illustrated in the accompanying drawings which are semi-diagrammatic and in which:

FIG. 1 is a front elevation of the device;

FIG. 2 is a plan view of the device;

FIG. 3 is a front elevation to a larger scale than FIGS. 1 and 2 showing the transfer belt, seen at the left hand of FIG. 1;

FIG. 4 is a section through line 4—4 in FIG. 3;

FIG. 5 is a front elevation of the detent support bar and the adjacent portion of the guide rail, seen at the right hand end of FIG. 1;

FIG. 6 is a plan view of the detent support bar at the same position as FIG. 5;

FIGS. 7, 8 and 9 illustrate work piece-gripping clamps, FIG. 7 being a front elevation showing two clamps side by side and coupled together, FIG. 8 being a plan view of the two clamps coupled together and FIG. 9 being an end view looking on the left hand end of FIG. 6, while FIG. 10 shows how the clamp-uncoupling mechanism operates.

In the drawings 1 denotes a machine frame which supports a guide rail 2 in the form of an endless loop and a machine support 3 for supporting a machine for performing a desired operation on work pieces, the guide rail 2 being disposed parallel to the direction of feed of a machine fitted to the support 3. In the example illustrated the support means 3 carries a sewing machine head and feed mechanism 4 and the operation to be performed here is to seam the edges of work pieces. 5 denotes a circulatory transfer belt the lower flight of which is parallel to the direction of feed of the machine 4 and extends in advance of and rearwardly of the work-performing part of the machine 4, i.e., the needle. The transfer belt 5 operates in conjunction with an undriven under belt 6. The under belt 6 is formed of magnetically influenced material and has its upper flight close to and parallel with the transfer belt 5. The lower flight of the transfer belt 5 is held in position by a carrier bar 7 along the lower surface of which the lower flight of the transfer belt 5 slides as the transfer belt circulates. The carrier bar 7 supports horseshoe magnets 8 which straddle the carrier bar 7 and the pole faces of which are connected to two bars of magnetizable material 9 constituting magnet pole pieces and disposed one on each side of the lower flight of the transfer belt 5. The lower surfaces of the bars 9 are at a slightly higher elevation than the under-surface of the lower flight of the transfer belt 5. The transfer belt 5 is driven by one of two toothed wheels 10 geared to a driving motor (not shown).

The guide rail 2 supports a number of work piece-gripping clamps 11 slidable along the guide rail. 12 denotes an endless clamp-return belt which makes frictional contact with clamps on the return portion of the guide rail indicated as 2A. 13 denotes a thruster device supported by the frame 1 at the loading end of the device which is the right hand end as seen in FIG. 1, the other end of the device being the operation-performing end. The thruster device 13 is furnished with a piston connected to a detent support bar 14 mounted to be reciprocable parallel with and above the guide rail 2 at the loaidng end of the device. The bar 14 carries mounted thereon a number of detent devices 15 slidable along the bar 14, each detent device 15 carrying a spring-loading detent 16 engageable with fixed abutments 17 projecting from the tops of the clamps 11. The bar 14 carries a series of stops 18 in the form of pins which progressively increase in diameter from the end of the bar 14 adjacent to the transfer belt 5 to the end remote from the transfer belt. The positions of the stops 18 are adjustable on the bar 14. The portions of the detent devices 15 encircling the bar 14 are formed as straps wrapping the bar 14 but the ends of each strap of each detent device terminate short of one another so as to present between them a gap 19 in line with the stops 18. The gaps 19 in successive detents counting from the end of the bar 14 adjacent the transfer belt 5 become progressively wider. The widths of the gaps 19 and the stops 18 are such that when the bar 14 is moved towards the machine support 3 each stop 18 comes into engagement with a respective detent device 15 which has a gap 19 wide enough to allow all the preceding stops 18 to pass through but is too narrow to allow passage of the stop associated with that detent device. 20 denotes a fixed abutment placed to be engaged by the detent device 15 furthest away from the transfer belt 5. 21 denotes an escapement lever operatively connected to the detent support bar 14. The lever 21 is formed at one end with a withdrawable arrester detent 22 and with a finger 23 at the other end to serve to separate groups of clamps, the detent 22 and the finger 23 being brought alternately into the path of the detent devices 15 by swinging movement of the escapement lever 21 initiated by reciprocating movement of the detent support bar 14.

Referring to FIGS. 6, 7, 8 and 9, each clamp 11 incorporates a slide 24 carrying a needle 25. The slide 24 is urged by a tension spring 26 to slide downwardly so that the needle 25 is retracted from an upper fixed plate 27 formed with a hole 28 aligned with the needle 25. The slide 24 is formed with a tongue 29 engageable with a catch constituted by a pawl 30 pivoted to the clamp body at 31 and hanging downwardly by its own weight. Each clamp 11 carries pivoted thereon a coupling hook 32 presenting an uncoupling tongue 33 and each clamp also carries a coupling pin 34 engageable by the coupling hook 32 of an adjacent clamp. 35 denotes a fixed abutment with which the uncoupling tongue 33 of one clamp of a pair of coupled clamps is brought into contact as the clamps move along the guide rail 2 during operation of the device whereby to cause the coupling hook 32 to be disengaged from the pin 34 in the adjacent clamp thus uncoupling the clamp. 36 denotes a fixed abutment engageable with the lower end of each pawl 30 as the clamps move along the guide rail 2 whereby to cause each pawl 30 to swing about the pivot 31 out of engagement with the tongue 29 on the slide 24. The lower end 24A of the slide 24 of each clamp projects below the clamp. A clamp-closing bar 37 coupled to an operating pedal 38 which also controls operation of the thruster device is movable vertically so that any clamp situated above the bar 37 can be closed by operation of the pedal 38, the bar 37 being then brought against the lower end 24A of the slide 24 of the clamp thus lifting the slide 24 until the tongue 29 is above the associated pawl 30 which therefor swings by its own weight under the tongue 29 thus holding the slide 24 in the raised position with the point of the needle 25 within the aligned hole 28 in the plate 27.

39 denotes a bunch of bristles arranged to press against a work piece being fed, the bunch of bristles 39 constituting a simple form of work-tensioning device and also being effective to smooth out the work pieces and particularly to smooth out the trailing edges of the work pieces. 40 denotes a work table provided to facilitate the fitting of work pieces to the device.

In practice, the general method of operating the device is as follows. The first work piece which may be of textile or plastics material is laid on the table 40 and clamps 11 mounted on the guide rail 2 are attached to the edge to be seamed of the work piece at intervals along the edge. The leading end of the work piece is inserted into the seam-forming machine 4 and the machine started. As the device operates, the material is fed into the machine 4 and the pull of the machine feed mechanism assisted by the movement of the transfer belt 5 pulls the material into the machine 4 and causes the clamps 11 to slide along the guide rail 2. Successive work pieces are attached to one another in succession, each succeeding work piece being attached to the immediately preceding work piece by the coupling together of two clamps 11 (see FIG. 7), connected respectively to the adjacent trailing and leading ends of the two work pieces so that the seaming action carries on continuously with work pieces being fed without pause towards the machine and being seamed therein. As each clamp 11 comes close to the seam-forming machine 4 it is opened and releases its grip on the work piece and moves on to the return portion 2A of the guide rail and is led back by the clamp-return belt 12 to the loading end of the guide rail 2 ready for attachment to the same or another work piece at a position further in advance of the seaming position. As each pair of clamps 11 coupling two consecutive work pieces together comes towards the seam-forming machine 4 the means for opening the clamps is operated. This nominally leaves the two adjacent ends of the work pieces unconnected. The transfer belt 5, however, continues the feed at this point and leads the leading end of the succeeding work piece into the feed mechanism of the machine 4 whereby to continue the feeding action. The cutting means comes into action when the trailing end of each work piece has passed through the sewing machine to cut the seaming thread between the successive work pieces.

The operation of the various parts is described in detail below. To space the clamps 11 at the loading position i.e. at the table 40, as the clamps 11 are fed by the return portion 2A of the guide rail to the waiting position the arrester detent 22 is in position to stop the leading open clamp and the following clamps come against the leading clamp and form a close queue at the waiitng position. (See FIG. 6 where the arrester detent 22 is shown as just withdrawn with the clamps ready to be fed.) When the operator has released the operating pedal 38 after the last feeding operation the detent support bar 14 had been retracted from the operating table 40 carrying with it the detent devices 15. As what was the leading detent device in the retracting direction, i.e., the extreme right hand detent in FIG. 5, came against the detent abutment 20 the leading detent device was stopped from further retracting movement and as each detent behind the detent in front came against the arrested detent in front it was stopped from moving although the bar 14 continued its retracting movement. As the width of the gap 19 in each detent device is greater than the transverse dimension, i.e., the diameter of all the stops 18 particular to the detent devices at present behind it, i.e., the stops nearer the machine support 3 each detent device 15 can move past all the stops 18 normally behind it and reach the end of the detent support bar 14 adjacent the machine support 3 during retracting movement of the bar 14, i.e., movement away from the table 40. All the detent devices thus come together at the end of the detent support bar 14 adjacent the machine support 3. The detent devices are so dimensioned that when they are closed up to one another and brought into the position corresponding with the fully retracted position of the detent support bar 14 each detent device 15 engages a respective clamp 11 of the queue of waiting clamps. (See the right end of FIG. 5).

When the operator depresses the pedal 38 to initiate another cycle of feeding operations the clamp-closing bar 37 first rises and pushes upwards all the slides 24 of all the clamps at present spaced along the table 40 during the last feeding operation of the thruster device 13 thus raising the points of the needles 25 into the holes 28 in the plates 27 and causing the clamps to grip a work piece previously applied to the clamps between the slides 24 and the plates 27 by the operator. As the slides 24 are raised the pawls 30 swing by their own weight under the tongues 29 thus holding the clamps closed after the operator releases the pedal 38 which causes the bar 37 to drop out of the way. The arrester detent 22 is withdrawn thus freeing the queuing clamps when the thruster 13 is energized to perform the feed stroke. As the detent support bar 14 moves in the feeding direction each detent device 15 endeavours to move its associated clamp 11 along the guide rail 2. The friction of each clamp 11 on the guide rail 2 resists the thrust of the associated detent 16 and the detent device 15 remains stationary while the advancing detent support bar 14 slides past it. Each stop 18 on the detent support bar 14 having a transverse dimension less than the width of the gap 19 in each detent device passes through the gap until the stop 18 having a transverse dimension greater than the width of the gap 19 in a particular detent device reaches that detent device whereupon this stop functions as an abutment for that detent device and pushes it forwardly along with the detent support bar 14. At the completion of the feed stroke of the detent support bar 14 and when the bar is lying along the length of the loading position, i.e., above the table 40, the clamps are thus spaced out along the loading position at the desired spacing as set by the adjustable stops. (See the left hand ends of FIGS. 5 and 6). As the leading clamp pushed forwardly by its detent device during the said feed stroke reached the loading position it came against and coupled itself to the trailing clamp of the preceding set by engagement of its coupling hook 32 with the coupling pin 34 on the other clamp. The said trailing clamp is already at the loading position and just loaded with the work piece previously referred to. These two clamps are then in the positions illustrated in FIGS. 7 and 8.

Continued feed movement of the detent support bar 14 to bring the clamps 11 entrained by the detent devices 15 thereon along to the loading position pushes the said preceding set of previously loaded clamps along the guide rail away from the table 40 towards the machine support 3. The work piece held by the said set of previously loaded clamps crumples into concertina shape as the clamps attached to the work piece are pushed together but this does not matter as the clamps are already attached at the predetermined intervals to the work piece and as the preceding work piece is entrained by the transfer belt 5 and pulled towards the machine 4 it pulls the crumpled work piece straight by means of the coupled clamps at the adjacent ends of the work pieces. Although the clamp at the trailing end of the crumpled work piece and the leading clamp of the set now at the loading position are now coupled the time taken for the crumpled work piece to straighten is sufficient to allow the operator to insert a fresh work piece into the clamps at the loading table 40 and the thruster device 13 to complete another stroke pushing the now loaded clamps away from the loading position and bringing yet another set of clamps to the loading position in performance of another cycle of pushing operations in the manner exactly as already described. As soon as the arrester detent 22 is swung away from the set of queuing clamps to permit them to move forward the finger 23 moves in behind the said set of clamps to prevent the following clamps from moving forwards out of turn.

The stationary magnetic pole pieces 9 attract the upper flight of the under belt 6 towards them and cause the upper flight of the under belt 6 to press against the lower flight of the transfer belt 5. Each work piece arriving at the transfer belt 5 and passing between the under belt 6 and the transfer belt 5 is thus gripped between the belts 5 and 6 and is carried along with the transfer belt 5, the under belt 6 moving freely along with the transfer belt 5 by the frictional contact between the under belt 6 and the work pieces and the work pieces and the transfer belt 5. This provides a virtually positive feed of the work pieces through the seam-forming machine.

What is claimed is:

1. A device for automatically guiding work pieces of sheet material incorporating a machine support arranged to support a machine for performing a desired operation on a work piece, a guide rail fixed relative to the machine support in an orientation parallel to the direction of feed of a machine to be fitted to the support so that one end of the guide rail is adjacent the machine support and the other end is remote from the machine support, several work piece-gripping clamps freely slidable along the rail, a circulatory transfer belt arranged to receive and feed work pieces, one flight of the transfer belt being disposed parallel to the said direction of feed and extending in advance of and also rearwardly of the position to be occupied by a machine on the machine support, means for returning clamps from the end of the guide rail adjacent to the machine support to the end of the guide rail remote from the machine support, a thruster device operative to engage a selected number of clamps at the end of the guide rail remote from the machine support and push them to a chosen loading position on the guide rail, clamp-spacing mechanism operative to engage and space said selected clamps a desired distance apart at the loading position, clamp-operating means operative to cause the spaced clamps at the chosen loading position to grip a work piece placed at the loading station, and clamp release means operative to cause each clamp to release its grip on the work piece as it approaches the machine support while moving along the guide rail.

2. A device as claimed in claim 1 incorporating a work-tensioning device operable to apply a retarding force to a work piece being fed.

3. A device as claimed in claim 2 in which the work-tensioning device is a circulatory belt one flight of which is disposed parallel to the direction of feed of a machine fitted to the machine support.

4. A device as claimed in claim 2 in which the work-tensioning device is a bunch of bristles arranged to press against a work piece being fed.

5. A device as claimed in claim 1 in which the clamps are fitted with coupling means so that the two adjacent clamps may be coupled to one another.

6. A device as claimed in claim 1 including a manually operable lever arranged to control operation of the thruster device and also to be operative to close the clamps at the loading position on to a work piece placed thereon.

7. A device as claimed in claim 1 incorporaitng an undriven under belt located below the transfer belt and means drivingly coupled to the transfer belt.

8. A device as claimed in claim 1 in which the means for causing each clamp to grip a work piece applied to it at the loading position includes a clamp-closing bar extending along the length of the loading position and movable towards all clamps located anywhere at the loading position to engage the clamps and close them.

9. A device as claimed in claim 1 in which the guide rail incorporates a return portion arranged to receive clamps after they have released their grip on a work piece.

10. A device as claimed in claim 9 in which the guide rail is formed as an endless loop having two substantially parallel portions one of which constitutes the portion of the guide rail leading to the machine support and the other of which constitutes the return portion.

11. A device as claimed in claim 10 incorporating a circulatory clamp-return belt operative to engage clamps entering the return portion of the guide rail and move the clamps back to the end of the guide rail remote from the machine support.

12. A device as claimed in claim 1 in which each clamp includes a body engageable with the guide rail and a work-piece gripping portion incorporating a plate fixed to the body and formed with a hole, a slide movable on the body, a needle mounted on the slide and aligned with the hole in the plate, the slide being movable between two extreme positions one of which is a clamp-closed position in which the tip of the needle is within the hole so that a work piece previously impaled on the needle is held by the clamp, and the other of which is a clamp-open position in which the needle is withdrawn from the hole, and spring means urging the slide to move to the clamp-open position.

13. A device as claimed in claim 12 in which the slide is formed with a tongue, and a pawl pivoted to the clamp body is engageable with the tongue whereby to retain the slide in an advanced position against the action of the spring with the point of the needle within the hole.

14. A device as claimed in claim 13 incorporating a fixed abutment engageable with the pawl of each clamp at a chosen position of the clamp on the guide rail to withdraw the pawl from the tongue and permit the slide to retract under the influence of its spring thereby withdrawing the needle from the hole and opening the clamp.

15. A device as claimed in claim 12 in which the clamp carries a coupling hook pivoted to the body and a coupling pin fixed to the body the coupling pin being engageable by the coupling hook of an adjacent clamp, said coupling hook presenting an uncoupling tongue.

16. A device as claimed in claim 15 incorporating a fixed abutment engageable with the uncoupling tongue of the coupling hook at a chosen position of the clamp on the guide rail whereby to withdraw the coupling hook from the coupling pin of an adjacent clamp to which it may be attached.

17. A device as claimed in claim 1, in which the clamp-spacing mechanism includes a detent support bar disposed parallel with and reciprocable in a direction parallel with the guide rail, i.e., in a feeding direction towards and a retracting direction from the machine support, detent devices slidably mounted on the detent support bar, each detent device being capable of entraining a clamp only when moved in the feeding direction, stops adjustably mounted on the bar and so cooperating with the detent devices that all said detent devices can slide freely along the bar to the end of the bar adjacent the machine support, but each detent device can slide along the bar towards the end remote from the machine support only as far as a stop particular to that detent device.

18. A device as claimed in claim 17 including a withdrawable arrester detent timed to operate in relation to movement of the thruster to engage the first clamp reaching a waiting position in advance of the loading position so that the following clamps form a close queue, and to be withdrawn when a set of clamps is to be moved to the loading position by movement of the detent support bar in the feeding direction towards the loading position, and a detent abutment engageable by the detent device which leads when the detent support bar is moving in the retracting direction away from the loading position, the arrester detent and the detent abutment being so located relatively to one another that when a queue of clamps is waiting at the waiting position and the bar is fully retracted each detent device is placed to engage a respective clamp.

19. A device as claimed in claim 17 in which each stop is formed to have a portion having a transverse dimension which in each succeeding stop nearer the end of the detent support bar remote from the machine support is progressively greater than that of the preceding stop and each detent device is formed with an open slot in line with the said portions of the stops, the width of the slot in each succeeding detent device nearer the end of the detent support bar remote from the machine support being greater than the width of the slot in the preceding detent device, while the width of the slot in each detent device is less than the transverse dimension of the said portion of its particular stop but greater than the transverse dimensions of the said portions of the preceding stops.

20. A device as claimed in claim 1 including driving means drivingly coupled to the transfer belt.

* * * * *